(12) United States Patent
Isabelle et al.

(10) Patent No.: US 7,543,932 B1
(45) Date of Patent: Jun. 9, 2009

(54) EYEWEAR WITH PIVOTABLE TEMPLES

(75) Inventors: Paul Isabelle, St-Augustin-de-Desmaures (CA); Marc Lamontagne, Repentigny (CA); Jean-Christophe Doyon, Terrebonne (CA); Sébastien Demers, Rawdon (CA)

(73) Assignee: North Safety Products Limited, Anjou, Quebec (CA)

( * ) Notice: Subject to any disclaimer, the term of this patent is extended or adjusted under 35 U.S.C. 154(b) by 0 days.

(21) Appl. No.: 12/038,903

(22) Filed: Feb. 28, 2008

(51) Int. Cl.
   *G02C 5/14* (2006.01)
(52) U.S. Cl. .................. 351/120; 351/111; 351/119
(58) Field of Classification Search ................ 351/120, 351/118, 119, 111, 158, 153, 41
   See application file for complete search history.

(56) References Cited

U.S. PATENT DOCUMENTS

| | | | |
|---|---|---|---|
| 3,907,410 | A | 9/1975 | Richmond et al. |
| 4,527,291 | A | 7/1985 | Nussbickl |
| 5,980,038 | A | 11/1999 | Chen |
| 6,086,200 | A | 7/2000 | Wang-Lee |
| 6,364,479 | B1 | 4/2002 | Wu |
| 6,464,354 | B1 | 10/2002 | Chen et al. |
| 6,543,896 | B1 | 4/2003 | Huang |
| 7,300,150 | B1* | 11/2007 | Chen .......................... 351/120 |
| 2005/0270477 | A1 | 12/2005 | Curci et al. |
| 2006/0221297 | A1 | 10/2006 | Tsai |

OTHER PUBLICATIONS

European Search Report: EP 08 29 0196.

* cited by examiner

*Primary Examiner*—Hung X Dang
(74) *Attorney, Agent, or Firm*—Ladas & Parry LLP

(57) ABSTRACT

An eyewear having a frame with lens and temples. Each of the temples comprises a first member having proximate and distal ends, the proximate end being pivotably mounted to the frame about a first axis such that the first member is movable from open and closed positions. The distal end comprises a first portion made of a first material. Each of the temples further comprises a second member extending along a second axis from a proximate end to a distal end, the second axis intersecting the first axis, wherein the proximate end of the second member comprises a second portion made of a second material. Moreover, one of the first and second portions is overmolded onto the other of the first and second portions for affixing together the first and second portions. In addition, the second material is different from and incompatible with the first material such that the second member is pivotable relative to the first member about a third axis intersecting the second axis.

18 Claims, 7 Drawing Sheets

EYEWEAR WITH PIVOTABLE TEMPLES

FIELD OF THE INVENTION

The present invention relates to the field of eyewear having temples with a first member pivotably mounted to the frame about a first axis and a second member that is pivotable relative to the first member about another axis.

BACKGROUND OF THE INVENTION

Eyewear such as corrective glasses, safety glasses and sun glasses are generally manufactured en masse for sale to a large market base. However, human physiology varies greatly from person to person, particularly about the head and face. As a result, eyewear currently available are never suited for use by everybody and not all available eyewear will fit a potential wearer. For the wearer this translates to frustration and risk as it is necessary to try on many eyewears in order to find one that fits and even then there is a chance that with time an eyewear will be found uncomfortable. For the manufacturer and seller, this means lost profits as individual eyewear cannot but be sold to a limited segment of a purchasing population.

In particular eyewear temples pose problems since they are made to lie on the wearer's ears, or more specifically on the upper auricular sulcus, but the position of ears with respect to each other and to other facial features varies enormously from person to person. If the eyewear's anchoring/resting points do not align with their respective facial features, such as the upper auricular sulcus and the nose, the eyewear will not rest properly on the user.

U.S. Pat. No. 6,364,479 provides a vertically adjustable temple that is made of a plurality of "snap-fit" components. U.S. Pat. No. 3,907,410 provides a pivotable temple that is made of two pieces that are screwed together. Those two solutions both suffer from the drawback that they are very complicated to manufacture and therefore expensive. Furthermore, the eyewear temple is generally a thin, sleek item and both these solutions are bulky and result in visually unappealing temples.

There is a need in the industry for an eyewear with pivotable temples that can be adjusted for a variety of wearer's heads and that are simple to manufacture.

SUMMARY OF THE INVENTION

In accordance with a first broad aspect, the present invention provides an eyewear having a frame with lens and temples. Each of the temples comprises a first member having proximate and distal ends, the proximate end being pivotably mounted to the frame about a first axis such that the first member is movable from open and closed positions. The distal end of the first member comprises a first portion made of a first material. Each of the temples further comprises a second member extending along a second axis from a proximate end to a distal end, the second axis intersecting the first axis, wherein the proximate end of the second member comprises a second portion made of a second material. One of the first and second portions is overmolded onto the other of the first and second portions for affixing together the first and second portions. The second material is different from and incompatible with the first material such that the second member is pivotable relative to the first member about a third axis intersecting the second axis.

These and other aspects and features of the present invention will now become apparent to those of ordinary skill in the art upon review of the following description of specific embodiments of the invention and the accompanying drawings.

BRIEF DESCRIPTION OF THE DRAWINGS

A detailed description of examples of implementation of the present invention is provided hereinbelow with reference to the following drawings, in which.

Figure 1:
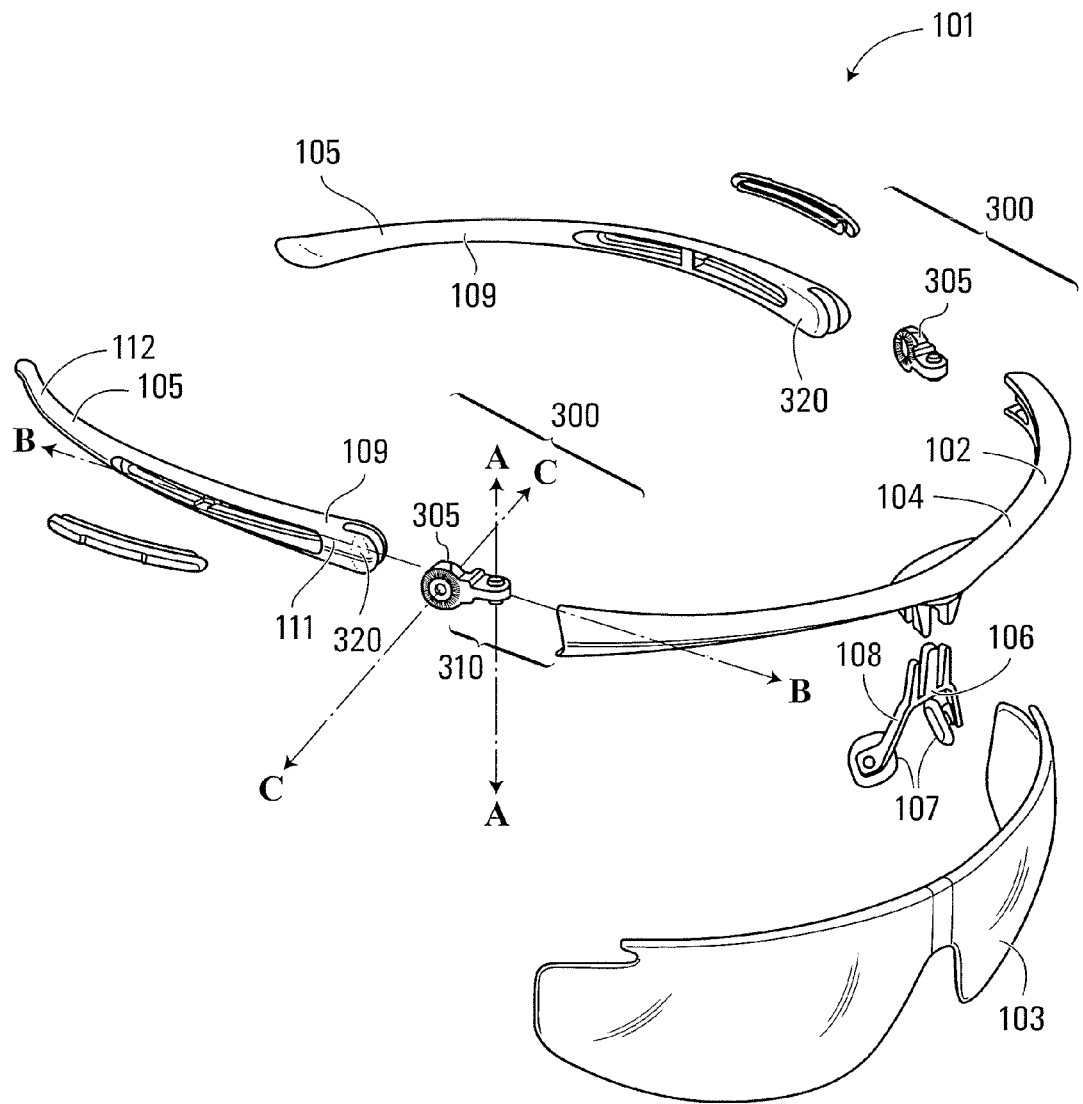
FIG. 1 is a front side exploded view of an eyewear in accordance to a non-limiting embodiment.

In the drawings, embodiments of the invention are illustrated by way of example. It is to be expressly understood that the description and drawings are only for purposes of illustration and as an aid to understanding, and are not intended to be a definition of the limits of the invention.

DETAILED DESCRIPTION OF THE EMBODIMENTS

It should be clearly understood that like reference numerals are intended to identify the same structural elements, parts, portions or surfaces consistently throughout the several drawing figures, as such elements, parts, portions or surfaces may be further described or explained by the entire written specifications, of which this detailed description is an integral part. In describing the embodiments, specific terminology is resorted to for the sake of clarity but the invention is not intended to be limited to the specific terms so selected, and it is understood that each specific term comprises all equivalents.

Figure 2:
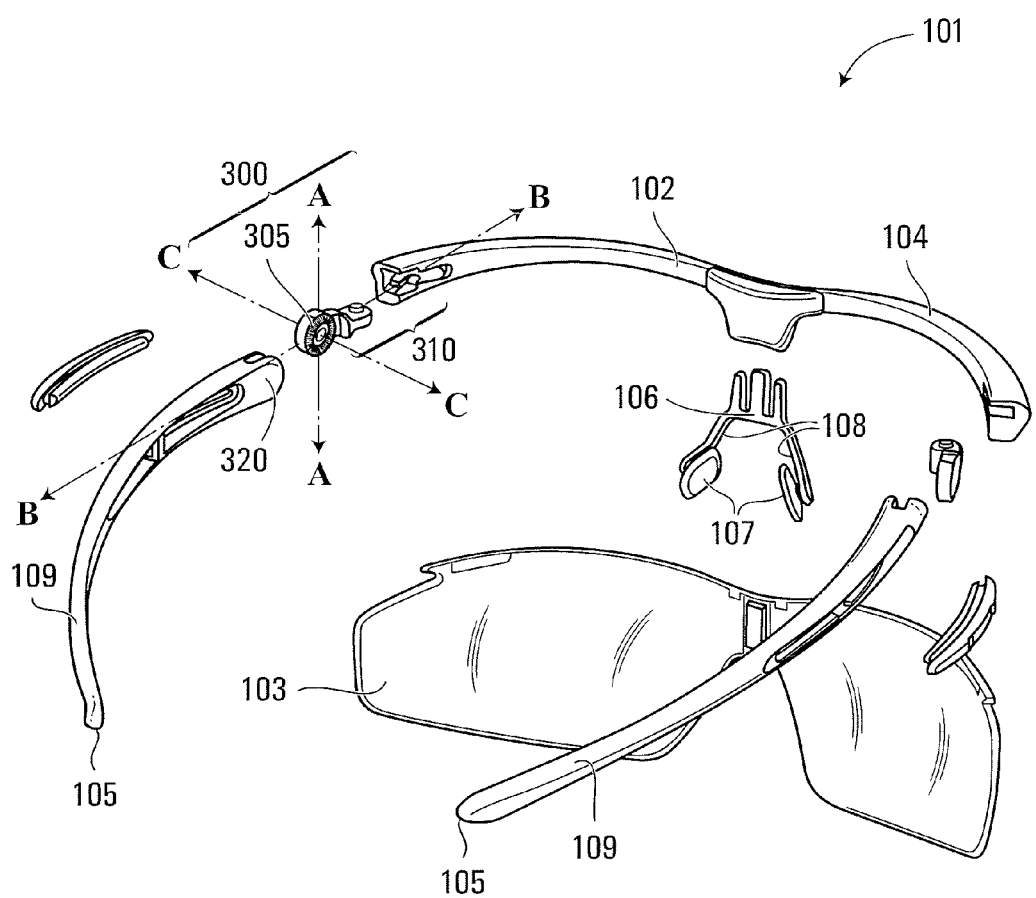
FIG. 2 is a rear side exploded view of the eyewear of FIG. 1.
Figure 3:
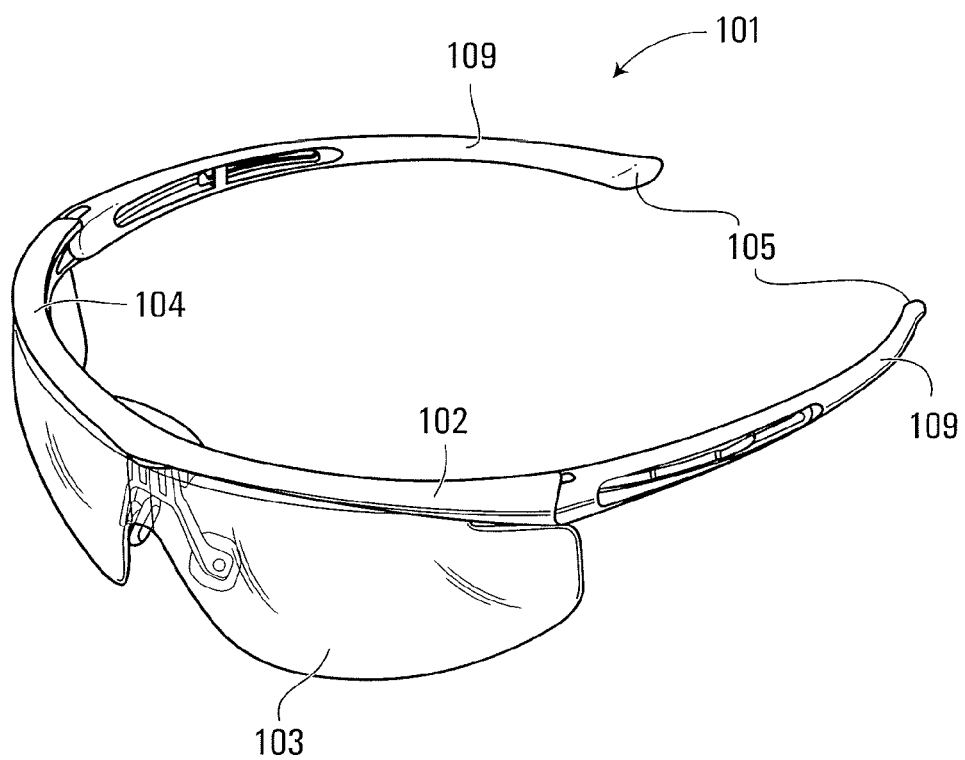
FIG. 3 is a perspective view of the eyewear of FIG. 1.

Unless otherwise indicated, the drawings are intended to be read together with the specification, and are to be considered a portion of the entire written description of this invention. As used in the following description, the terms "horizontal", "vertical", "left", "right", "up", "down" and the like, as well as adjectival and adverbial derivatives thereof (e.g., "horizontally", "rightwardly", "upwardly", "radially", etc.), simply refer to the orientation of the illustrated structure as the particular drawing figure faces the reader. FIGS. 1 to 3 illustrates an eyewear 101 in accordance with a non-limiting embodiment of the invention. In this example, the eyewear 101 is a pair of safety glasses having a frame 102, lenses 103, a nosepiece 106 and a pair of temples 105.

The nose piece 106 provides a point of support for the eyewear and may be fastened to the frame 102. In a non-limiting embodiment, nosepiece 106 is an adjustable nosepiece, displaceable along a generally vertical axis for adjusting to various facial constructions. In this example, the nosepiece 106 comprises a releasable clamping mechanism that holds nosepiece 106 at a given position in a generally vertical channel. In order to adjust the height of the nosepiece with respect to the frame 102 and/or lenses 103, the clamping mechanism is released and nosepiece 106 is displaced vertically to a desired position whereupon the clamping mechanism is reengaged. Nosepiece 106 also comprises nose pads 107 at the end of nose pad branches 108. In a non-limiting embodiment, the position of nose pads 107 with respect to the rest of the nosepiece 106 is also adjustable, for example by having deformable nose pad branches 108. In use, the nosepiece 106 provides a point of support for the eyewear 101 and prevents movement of the eyewear relative to the face in certain directions, notably in the downwards (towards the chin) direction but also in the rearwards (towards the back of the head) direction. It is to be understood that although the nosepiece 106 here has been described as an adjustable nosepiece any other arrangement may be used. For example, the nosepiece 106 may take the form of any nose-supporting structure and may be embedded in or integral with the lenses 103 or frame 102 or may even be completely absent.

The frame 102 is a semi-rimless frame made up primarily of a frame component 104 arranged along the top of the lenses 103 generally in a horizontal plane. Lenses 103 are fastened to frame component 104. The frame 102 holds the lenses 103 in place and may optionally rest, in use, against the wearer's face thus anchoring the eyewear against certain movements, such as rearward movement. The frame 102 does not need to be a semi-rimless frame as illustrated in FIG. 1 but can take many shapes. For example, the frame can be a full frame (fully surrounding a unitary or a pair of lenses 103) or three-piece rimless (made up of three pieces anchored in the lenses 103). The frame 102 may be distinct from the lenses 103 as shown here or may be integral with the lenses 103.

Lenses 103 may be protective lenses, shaded lenses, optical-correction lenses or any other lenses. In the non-limiting embodiment shown here, lenses 103 is a unitary protective lens covering a substantial portion of the field of vision of both eyes. However, it is to be understood that lenses 103 may be a pair of disjoint lenses or any other arrangement of lenses 103.

Each of the temples 105 has a first connecting member 305 connected with the frame 102 by a hinge assembly 310. Hinge assembly 310 permits the pivotal motion of temples 105 about a first axis A between an open and a closed position. Temples 105 each include a second member in the form of a branch 109 that extends along a second axis B from a proximal end 111, near the frame 102 to a distal end 112, which in use is near the back of the wearer's head. The branches 109 extend in a plane that is at an angle approximately normal to the frame component 104 when in the open position and can pivot to a closed position where they are in a plane angled approximately parallel to frame component 104. The eyewear 101 can thus be folded to a more compact form when not in use. Furthermore, it is not necessary for connecting member 305 to be hinged to the frame 102 via hinge assembly 310 but connecting member 305 may be rigidly connected to the frame 102 or even integral with frame 102. Also, while temples 105 are drawn here as two separate branch-like component, it should be understood that any of a number of temple arrangement, forms and shapes are possible. For example, temples 105 may loop around a wearer's ear or head. Furthermore, although the branches 109 are said to extend along the second axis, it should be noted that the branches 109 do not necessarily have a perfectly straight form but are preferably curved to embrace a wearer's physical features. Thus branches 109 may preferably curve around the wearer's head, and optionally around the auricular sulcus and thus anchor the eyewear 101 against movement in multiple directions. It is to be understood that a branch 109 so curved is still said to extend along the second axis insofar as it approximates the second axis on at least a portion of itself. Branches 109 may not be disjointed but be attached for example at their respective distal ends 112 such that they encircle the back of the wearer's head. In such a case, branches 109 are still said to extend along a second axis insofar as a portion of branches 109 adjacent to the proximal end 111 approximates the second axis.

When the eyewear is worn, the temples 105 lie along the side of the wearers head and preferably contact both the side of the wearer's head and the upper auricular sulcus. At the area of contact with the side of the wearer's head, the temples 105 may exert pressure against the side of the wearer's head with the resulting friction helping secure the eyewear in a given position on the wearer's head. The point of contact of the temple 105 with the upper auricular sulcus provides a point of anchoring against downward motion and thus helps hold the eyewear in place despite the pull of gravity.

In FIG. 3, the temples 105 (and therefore the connecting members 305) are in the open configuration. Temples 105 lie, along with frame component 104, in a generally horizontal plane. As mentioned above, in use, the branches 109 will contact the wearer's upper auricular sulcus and the nosepiece 106 will contact the wearer's nose. However, if the nosepiece 106 is too short or too long or if the wearer's ears are too high or too low for this configuration, or even if the wearer's ears are not at the same height as one another with respect to the rest of the face, the eyewear 101 will be angled on the wearer's face. As a result, certain parts of frame 102 or lens 103 may press uncomfortably against the wearer's face, the esthetic appearance of the eyewear 101 may be marred and the optical effects of lens 103 may be negatively affected. Advantageously, however, the angle of each branch 109 with respect to the horizontal plane can be adjusted such that frame 102 and lens 103 maintain the ideal angle and orientation on a wearer's head.

Figure 4:
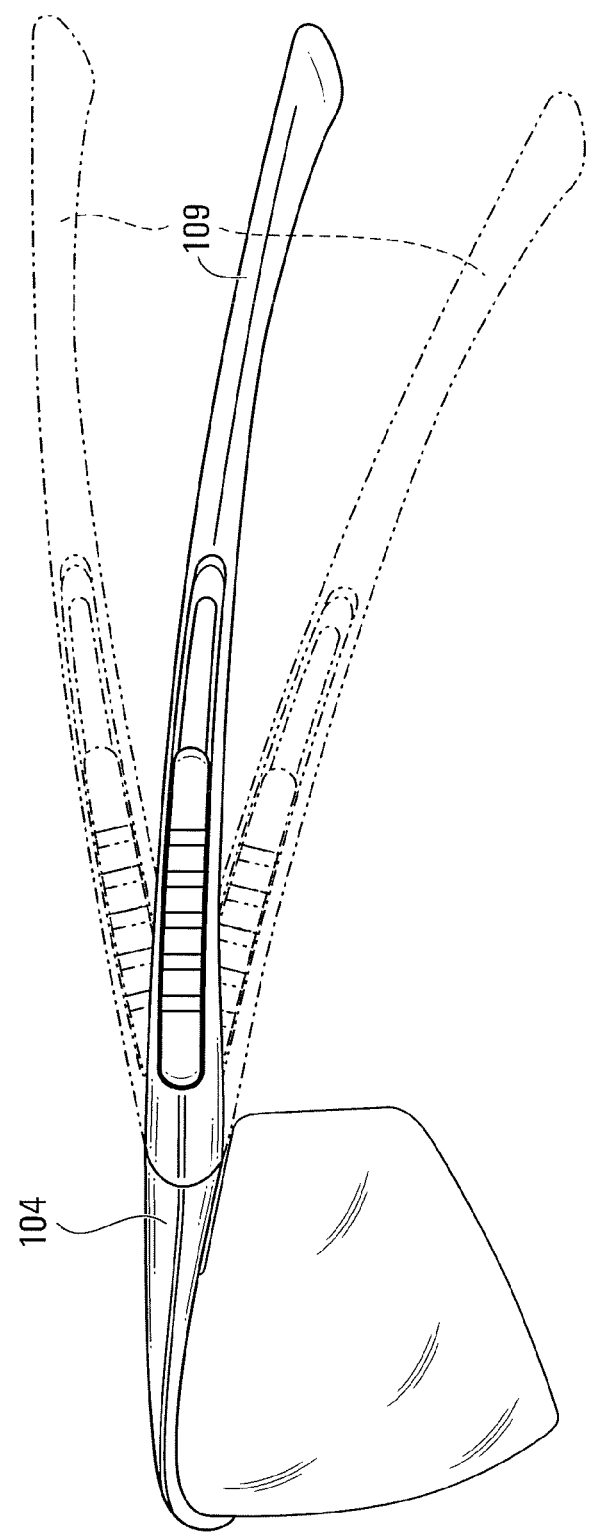
FIG. 4 is a side elevation view of the eyewear of FIG. 1 with temples in three different configurations.

FIG. 4 shows a side elevation view of eyewear 101 in three different configurations. Branch 109 is pivotable relative to connecting member 305 (hidden here by branch 109 and frame component 104) such that it can be angled upward and downward from the horizontal plane containing frame component 104. Thus branch 109 can be pivoted relative to connecting member 305 within a suitable range of motion. Preferably, frictional or other forces maintain branch 109 at an angle once it has been pivoted thereto. In a non-limiting embodiment, pivotal motion of branch 109 relative to connecting member 305 is incremental, for example pivotal motion may be ratcheted and branch 109 may "click" from one discrete position to the next as it pivots relative to connecting member 305.

Figure 5:
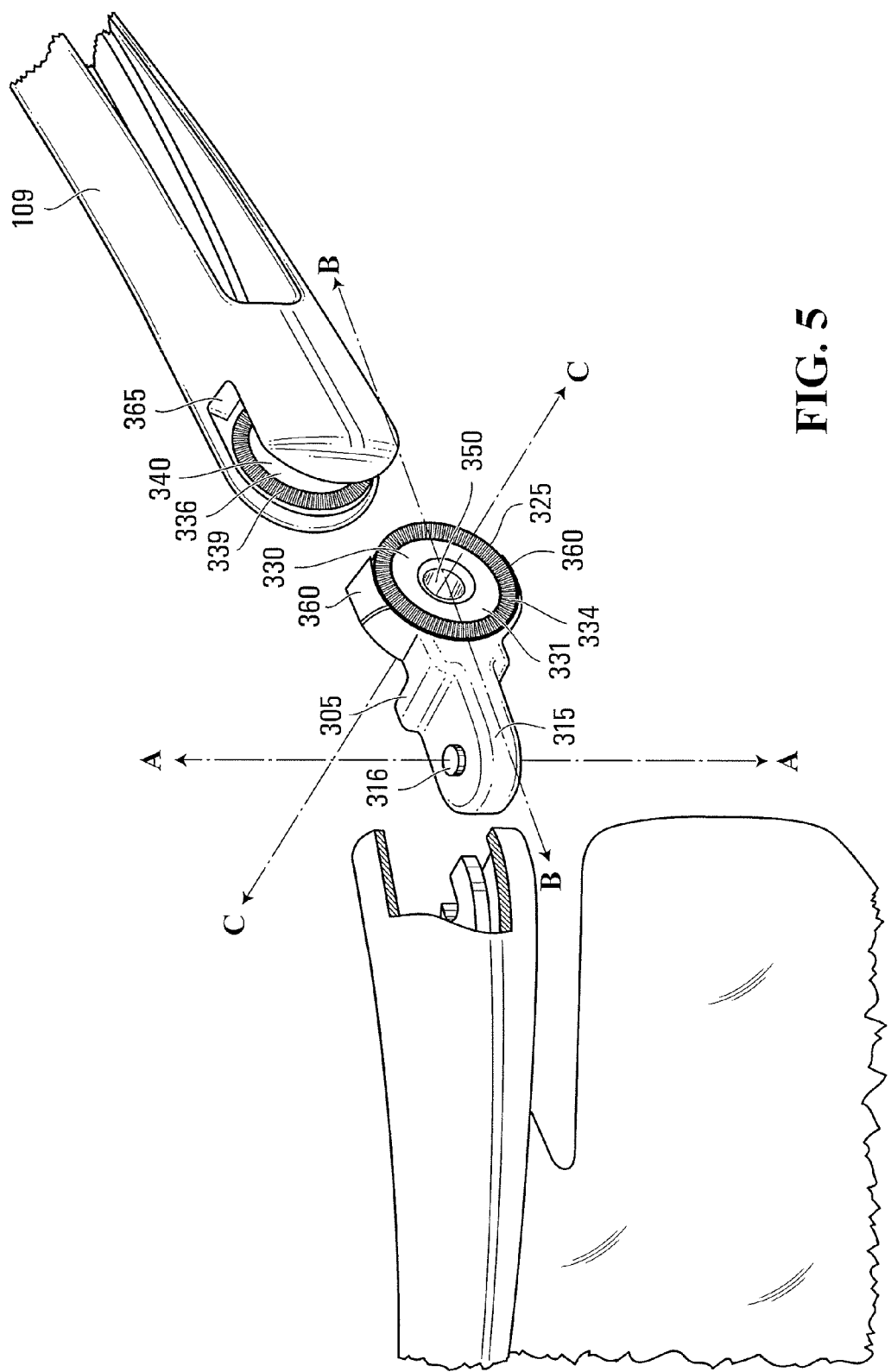
FIG. 5 is an exploded enlarged view of a portion of the eyewear of FIG. 1.

FIG. 5 shows an exploded enlarged view of the connection arrangement of branch 109 with frame 102. Hinge assembly 310 may be any suitable means of permitting connecting member 305 (and temple 105 comprising connecting member 305) to move from an open to a closed configuration or to pivot within a horizontal plane. In the non-limiting example shown here, hinge assembly 310 here includes a hinge for permitting connecting member 305 (and with it, the rest of temple 105) to pivot about the first axis A. Hinge assembly 310 includes the proximate end 315 of connecting member 305 and the hinge-end of frame component 104. Proximate end 315 of connecting member 305 includes protuberances 316 (only one visible) the first axis. Protuberances 316 are received in corresponding cavities in the frame component 104 such that proximate end 315 of connecting member 305 is held securely yet pivotably in frame component 104. In a non-limiting example, the connecting member 305 is connected by "snap-fit" arrangement whereby the proximate end 315 of the connecting member 305 is forced into the frame component 104 until protuberances 316 "snap" into their corresponding cavities. Hinge assembly 310 has been described here according to a non-limiting example, but it is to be understood that any of the many eyewear hinge solutions can be used here without departing from the intended scope of the invention. For example, hinge assembly 310 could feature a screw-hinge assembly typical of prescription eyewear. Alternatively, hinge mechanism can comprise a ball-socket or an elastically deformable material, such as a flexible connection that bends to move temple 105 from an open to a closed configuration. In the latter case, as in many other possible cases, connecting member 305 is integral with frame 102. Finally, although connecting member 305 has been shown here to connect with frame component 104, it is to be understood that connecting member 305 may connect with any other part of the frame 102, particularly if the frame 102 is a full frame. Alternatively, connecting member 305 may connect with another part of eyewear 101 such as the lens 103, particularly when frame 102 is a three-piece rimless frame or where lens 103 is integral with the frame 102.

At the distal end 325 of connecting member 305 there is a first portion 330 made of a first material. In a non-limiting example, the entire connecting member 305 including the first portion 330 is made of a single material.

Branch 109 extends generally along the second axis B that intersects the first axis A. The second axis B is said to intersect with the first axis A because in at least one configuration it intersects with the first axis. At the proximal end 111 of branch 109, there is a second portion 340 made of a second material. In a non-limiting example, a substantial portion of branch 109, including second portion 340, extending along the second axis B is made of a single material while a curvature-adjusting mechanism and a soft ear-contacting tip are both included in temple 105 and both contain different materials.

The first and second material are different and incompatible, one of the first portion 330 of the connecting member 305 and the second portions 340 of the branch 109 is overmolded onto the other such that the branch 109 is pivotable relative to the connecting member 305. Thus, the materials of the first portion 330 and the second portion 340 must be suitable for molding together as will be readily understood by a person skilled in the art. The materials are also selected for their incompatibility during the overmolding process such that they do not react or create chemical bonds with one another. The materials will also be selected for their relative melting points such that during overmolding, the second material can be injected a temperature that will not melt the first material. In a non-limiting example, the melting point of the first material is between 270 and 300 degrees Celsius while the melting point of the second material is between 250 and 270 degrees Celsius. This is, of course, only an illustrative example, the actual melting temperature of the selected materials being liable to vary depending on the materials selected. Any particular material found suitable may be used, however in a non-limiting embodiment, the first portion 330 is made of polyamide while the second portion 340 is made of polycarbonate, a combination of polycarbonate and polyester, high-density polyethylene (HDPE) or acetal-based plastics.

For example, the first portion 330 may be made of:
Zytel™ ST801A NC010A by Dupont; or
Ultramid™ B3ZG6 by BASF, while the second portion may be made of:
Xylex™ X7203 by GE;
Xylex™ X8300 by GE;
Lexan™ EXL1483C by GE;
Durolon™ VR-2210 by Policarbonatos do Brasil;
Delrin™ 500P BK602 by Dupont;
Delrin™ 500P NC010 by Dupont; or
Sclair™ 2907 by Nova Chemicals.

In a particular non-limiting embodiment, the entire connecting member 305 is made of Zytel™ ST801A NC010A while a substantial portion of the branch 109 including the second portion 340 is made of Xylex™ X7203.

Overmolding may be done in any suitable manner, as one of ordinary skill in the art will readily understand. It is to be clearly understood that the term overmolding, is meant to encompass any technique in which a first material is molded into a first piece or portion and a second material is molded over this first piece or portion. For example, a dual-injection molding machine may be used having two injection units and two different cavities. Alternatively, overmolding can be performed using a slide and/or reinserting the first previously-molded part into a cavity for molding the second part onto the first. In certain cases, suitable techniques may also be called co-injection molding, where for example a single injection unit injects a first material to mold it into a first shape, a slide is then removed and a second material is injected by the same injection unit over the first shape. Essentially any known technique for overmolding can be used, the exact choice of which will depend on a number of factors including cost considerations, product and tooling complexity, process time and the choice of automation or manual manipulation.

The overmolding process simplifies the manufacturing of an otherwise-complex item. Any of the two portions can be overmolded onto the other. However, in a non-limiting embodiment, the first portion 330 is first injection molded from a first material, along with the rest of connecting member 305 and the second portion 340 is then overmolded onto the first portion 330 from a second material.

Figure 6:
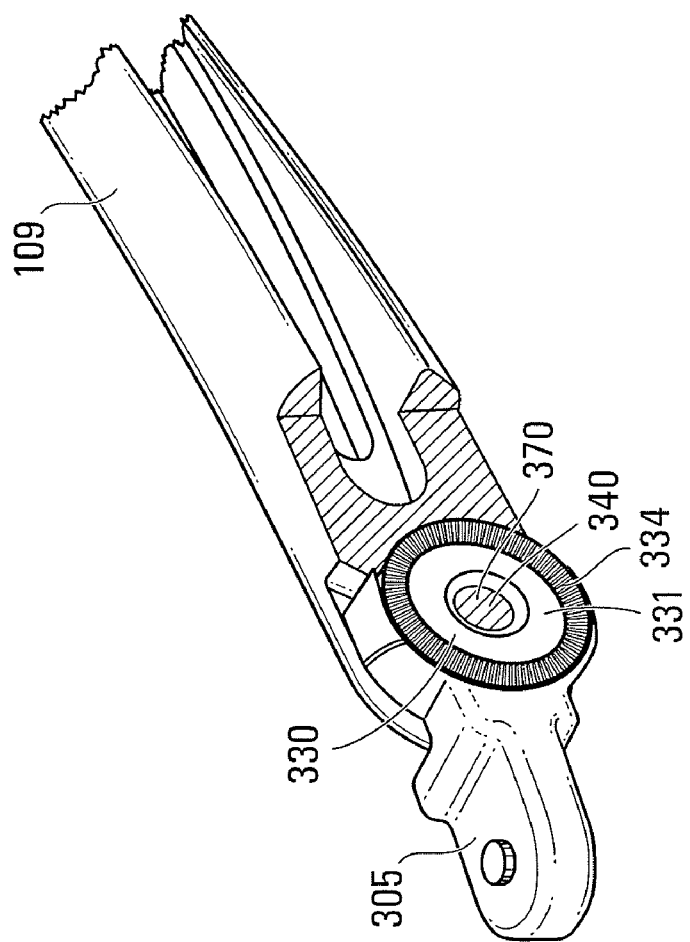
FIG. 6 is a broken-away enlarged view of a portion of a temple of the eyewear of FIG. 1.
Figure 7:
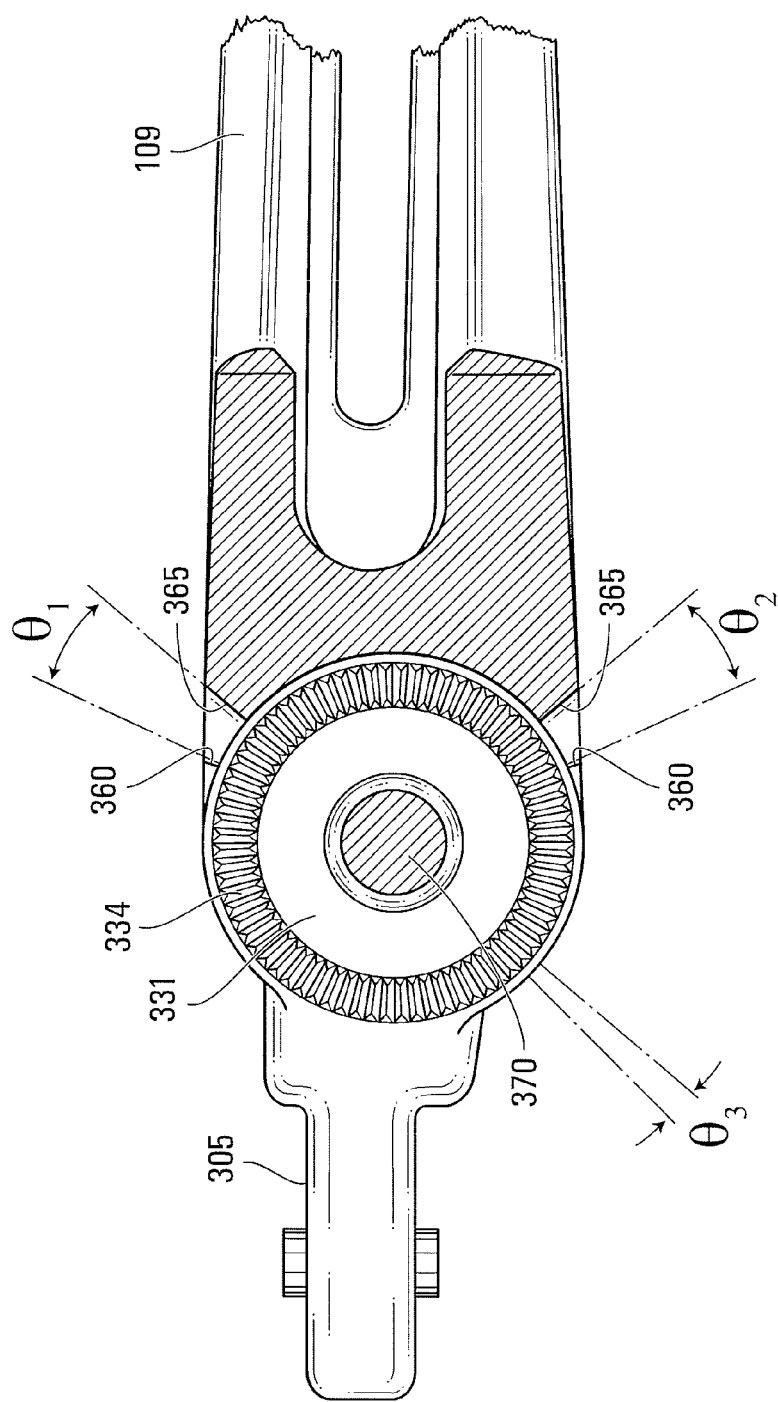
FIG. 7 is a side elevation enlarged view of the broken-away enlarged portion of temple of FIG. 6.

As shown in FIGS. 5 to 7, the first portion 330 is roughly shaped like a disc with a central bore 350. Overmolded second portion 340 has a complementary form and has two roughly circular opposite sides 336 (only one visible here) and a rod 370 (see FIG. 7) extending between the two respective opposite sides 336 in their middle. Here the complementary form of second portion 340 was adopted during the overmolding process.

It is to be understood that the example provided here illustrates but one of a plurality of possible shapes of the first portion 330 and the second portion 340 and that any suitable shape allowing the pivotal motion of connecting member 305 and branch 109 relative to one another and suited for overmolding may be used. For example, the central bore 350 in the disc-shaped the first portion 330 is here a through hole, but it could also be a blind hole on one or both sides of the disc. Alternatively, the arrangement could by a non-symmetrical version of the shapes shown here. In yet another embodiment, the second portion 340 does not need to cover the first portion 330 but comprises a rod and two arms extending over the surface of the first portion 330 and joining the rod to the rest of the branch 109. In yet another example, the first portion 330 may have the shape of a disc attached on its peripheral edge to the rest of the connecting member 305 while the second portion 340 may be a complementary hollowed-out disc in which fits the first portion 330. In this example, a window on the peripheral edge of the hollowed-out disc on the proximal side could define the range of pivoting possible. Of course, it is to be understood that for any of the examples described above, the shapes of the first portion 330 and the second portion 340 shown here may also be inversed.

The overmolded branch 109 and connecting member 305 provide a pivotable arrangement that allows temples 105 to be adjusted to fit different heads. In a non-limiting example, friction between the first portion 330 and the second portion 340 provides the required resistance to keep the branch 109 and the connecting member 305 immobile relative to one another after pivotal motion.

In another non-limiting embodiment, an additional mechanism is provided to further hold branch 109 and connecting member 305 immobile relative to one another when not being pivoted. A plurality of ridges alternating with grooves is provided on a surface of the first-molded piece such that during the overmolding process, a part of the second-molded piece has a plurality of grooves with ridges, which register with the respective ridges and grooves of the first molded piece. The natural mating of the two complementary corrugated surfaces inhibits pivotal motion and hold the branch 109 and connecting member 305 in place relative to one another. This will be further explained in the context of the specific non-limiting example illustrated in the figures.

As shown in FIGS. 5 to 7, the connecting member 305 is the first-molded piece. The first portion 330 includes two opposed sides 331 (only one visible here) that are generally parallel. At least one (in this case, both) opposite sides 331 have a plurality of ridges alternating with grooves defining a corrugated ring 334. The ring 334 covers a portion of each side 331. It is to be understood that the ring 334 may only cover one of the opposed sides 331. While the ring 334 has been shown here as covering a portion of the side 331, it should be understood that the ring 334 may have any desired area, the exact size of the ring 334 depending inter alia on the amount of resistance to pivotal motion desired. For example, instead of the ring 334, the ridges and grooves may only cover a section of side 331. Moreover, instead of the ring 334, the ridges and grooves may entirely cover each side 331.

As shown in FIGS. 5 to 7, ridges and grooves are at an angle normal to the direction of pivotal motion (i.e. normal to a tangent). This is the case here ridges and grooves are arranged along radii of opposed sides 331.

The second portion 340 of branch 109 is overmolded onto the first portion 330. In this non-limiting embodiment, the entire connecting member 305 was injection molded out of a single material and a substantial portion of branch 109 (all of branch 109 except parts of a curvature adjustment mechanism and a soft ear-contacting tip) is then created during the overmolding step. During the overmolding, the second portion 340 covers the first portion 330 and complements its shape. Thus, the central bore 350 is filled with the material of the overmolded piece, which creates the rod 370 extending between the opposite sides 336 and thereby connecting together the connecting member 305 and the branch 109. By overmolding a different and incompatible material over the opposite sides 331 of connecting member 305, sides 336 with registering corrugated rings 339 are created. Thus, each of the rings 339 has ridges registering with the respective grooves of the ring 334 and grooves registering with the respective ridges of the ring 334. The grooves and ridges of each ring 339 therefore are also arranged along the radii (of opposite sides 336, which are parallel to radii of opposite sides 331). See FIG. 6 for a broken-away view of connecting member 305 anchored within branch 109.

After the overmolding step, temple 105 is pivotably connected to connecting member 305 via the rod 370 while the second portion 340 and the first portion 330 interact to enable/inhibit pivotal motion. Grooves and ridges of the ring 334 register with the respective ridges and grooves of the ring 339 such that as connecting member 305 and branch 109 are pivoted relative to one another, ridges "click" from one groove to another such that the pivotal motion is ratcheted.

Once positioned, the friction between the first portion 330 and the second portion 340 as well as the normal forces acting between the walls of the mating ridges and grooves causes the temple 105 to maintain its configuration rigidly such that it does not undergo spontaneous pivotal motion under the force of gravity or other forces encountered in normal use of eyewear 101. The rigidity with which it is held in place, however is low enough that branch 109 can easily be pivoted relative to member 305 (and the rest of eyewear 101) manually. Advantageously, the result is a temple that can easily be adjusted and maintains its shape against naturally-encountered forces once adjusted.

Most head and face structures will not require temple adjustments beyond a certain range, and accordingly, pivotal motion in the non-limiting example provided is limited to a range of 30 degrees. Any suitable means for blocking pivotal motion beyond a certain range, or for otherwise confining pivotal motion, may be used. As is shown in FIGS. 5 to 7, a pair of stoppers 360 is provided on connecting member 305. When branch 109 is pivoted relative to the rest of eyewear 101 to a certain angle $\Theta_1$, for example to 15 degrees above the horizontal plane, the uppermost stopper 360 comes into contact with a stop wall 365 on branch 109 and prevents further movement in that direction. Similarly, in the opposite direction, when branch is pivoted to a certain angle $\Theta_2$, for example 15 degrees below the horizontal plane, the lowermost stopper 360 contacts with another stop wall 365 (not visible here) to prevent further movement in that direction.

As shown in FIG. 7, there is an angle of $\theta_3$ between two grooves (which is also the angle between two ridges). Angle $\theta_3$ may be, for example, of between 3 and 6 degrees and in a non-limiting embodiment, angle $\theta_3$ is of 5 degrees. This means that as branch 109 and connecting member 305 are pivoted relative to one another, they move ratchetedly by 5 degree increments.

A wearer using eyewear 101 described above can therefore advantageously angle temples 105 away from the horizontal plane, such that they contact the wearer's upper auricular sulcus while maintaining lenses 103 in the proper vertical orientation. Optionally, eyewear 101 also includes vertically adjustable nosepiece 106. Vertically adjustable nosepiece 106 permits the raising or lowering of lenses 103 relative to the eyes of a wearer such that the eyes can be well centered in lenses 103. The combinations of adjustment mechanism 300 and adjustable nosepiece 106 allows a wearer to adjust eyewear 101 such that the lenses are at an ideal orientation and height relative to the eyes thus allowing lenses 103 to provide the best effect (optical, protective or other) possible.

The above description has been given with reference to specific example, however these example were intended to illustrate, not limit, the invention. Many variations, possible variations exist that will be apparent to one skilled in the art, all of which are within the intended scope of the invention as defined by the appended claims.

The invention claimed is:

1. Eyewear having a frame with lens and temples, each of said temples comprising:
   (a) a first member having proximate and distal ends, said proximate end being pivotably mounted to said frame about a first axis such that said first member is movable between open and closed positions, said distal end comprising a first portion made of a first material; and
   (b) a second member extending along a second axis from a proximate end to a distal end, said second axis intersecting said first axis, wherein said proximate end of said second member comprises a second portion made of a second material, wherein said first and second portions are affixed together by having one of said first and second portions being overmolded onto the other of said first and second portions, and wherein said second material is different from and incompatible with said first material such that said second member is pivotable relative to said first member about a third axis intersecting said second axis.

2. Eyewear as defined in claim 1, wherein said first portion has first and second opposed sides extending generally along said second axis and said second portion has first and second opposed sides extending generally along said second axis, one of said first and second opposed sides of said first portion has a plurality of ridges alternating with grooves and one of said first and second opposed sides of said second portion has a plurality of ridges alternating with grooves, wherein said ridges and grooves of said first portion register with said respective grooves and ridges of said second portion.

3. Eyewear as defined in claim 1, wherein said first portion has first and second opposed sides extending generally along said second axis and said second portion has first and second opposed sides extending generally along said second axis, each of said first and second opposed sides of said first portion has a plurality of ridges alternating with grooves and each of said first and second opposed sides of said second portion has a plurality of ridges alternating with grooves, wherein said ridges and grooves of said first portion register with said respective grooves and ridges of said second portion.

4. Eyewear as defined in claim 3, wherein said ridges and grooves of said first and second portions extend radially from intersection point of second and third axes.

5. Eyewear as defined in claim 4, wherein said ridges are disposed around said third axis at an angle of 5 degrees from one another.

6. Eyewear as defined in claim 3, wherein said first and second opposed sides of said first portion and said first and second opposed sides of said second portion are entirely covered by said ridges and grooves.

7. Eyewear as defined in claim 3, wherein said ridges and groves of each of said first and second opposed sides of said first portion and said first and second opposed sides of said second portion are disposed in a substantially annular arrangement, said annular arrangement covering only a portion of each respective sides.

8. Eyewear as defined in claim 3, wherein said ridges and grooves of said first portion and ridges and grooves of said second portion move over each other during pivotal motion of said second member relative to said first member such that said pivotal motion causes said ridges and grooves of first portion to register with said ridges and grooves of said second portion in a different arrangement as before said pivotal motion.

9. Eyewear as defined in claim 3, wherein said second member is pivotable relative to said first member in discrete increments such that pivotal motion of said second member relative to said first member about third axis is ratcheted.

10. Eyewear as defined in claim 1, wherein said proximate end of said first member has a protuberance extending along said first axis and said first portion of said first member has an aperture extending along said third axis, and wherein part of said second portion defines a rod passing through said aperture.

11. Eyewear as defined in claim 1, wherein said second portion of said second member has a first aperture extending along said third axis, and wherein part of said first portion defines a rod passing through said first aperture.

12. Eyewear as defined in claim 1, wherein said second member is pivotable relative to said first member about third axis over a range of 30 degrees.

13. Eyewear as defined in claim 1, wherein said first material has a different melting temperature than said second material.

14. Eyewear as defined in claim 1, wherein the first material is polyamide.

15. Eyewear as defined in claim 1, wherein the first material is selected from the group consisting of: Dupont Zytel ST801A NC010A and BASF Ultramid B3ZG6.

16. Eyewear as defined in claim 1, wherein the second material is polycarbonate, a mixture of polycarbonate and polyester, high density polyethylene, or acetal.

17. Eyewear as defined in claim 1, wherein the second material is selected from the group consisting of: GE Xylex X7203, GE Xylex X8300, Policarbonatos do Brasil Durlon VR-2210, GE Lexan EXL 1483C, Derlin 500P BK602, Derlin 500P NC010 and Sclair 2907.

18. Eyewear as defined in claim 1, wherein said distal end of said second member extends along a curve for following a physical feature of the wearer's body.

* * * * *